Oct. 1, 1957  H. S. NEWCOMER ET AL  2,807,922
PRISM MACHINING METHOD
Filed Oct. 13, 1955

*INVENTORS*
HARRY SIDNEY NEWCOMER
ARTHUR F. ANDERSON

United States Patent Office 2,807,922
Patented Oct. 1, 1957

2,807,922

PRISM MACHINING METHOD

Harry Sidney Newcomer, Cape May, N. J., and Arthur F. Anderson, Livonia, Mich.; said Anderson assignor to said Newcomer Application October 13, 1955, Serial No. 540,181

8 Claims. (Cl. 51—284)

This invention relates to a method of machining optical prisms and is directed to the provision of a more accurate and at the same time a more economical method of producing prisms of high quality.

Prior methods of producing optical prisms rely upon grinding the glass to establish plane surfaces which have predetermined angular relationships to each other. The accuracy of the final optical faces depends entirely upon the degree of accuracy produced by the grinding operation, since the final polishing of the faces is done by positioning the prism in a bed of plaster with its position established by reference to the surface to be polished. This step is repeated for each optical surface of the prism, and the method lack any reference from one finished surface to the other, so that each face is finished independently of the other faces.

It is an object of the present invention to provide a prism machining method in which the optical faces are finished with accurate reference to each other.

It is a further object to provide such a method wherein the prism has a reference surface outside of its optical faces, but which is related thereto so as to give accurate orientation of the prism for assembly purposes.

A further object is to provide a method of producing cemented achromatic prisms in which more accurate orientation in assembly is provided.

Another object is to provide a method of machining and assembling cemented achromatic prisms in which orientation of each prism element is established, both during the finishing process and the assembling process, by reference to a single locating surface.

Further objects and advantages of the present invention will be apparent from the following description, reference being had to the accompanying drawing wherein a preferred form of the present invention is clearly shown.

Figure 1:
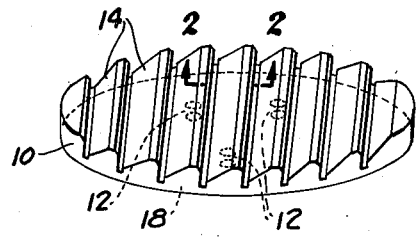
Figure 1 is a perspective view of a prism finishing fixture utilized in a preferred embodiment of the present invention.

The fixture illustrated in Figure 1 comprises a thick metal disc preferably of cast iron, designated 10, and having on its under surface a series of holes, 12, whereby the disc may be secured to a suitable arbor of a glass grinding machine and of a glass polishing machine. The top surface of the disc 10 is provided with a plurality of transverse grooves 14 which may be arranged in parallel fashion as illustrated. Each groove is accurately machined with reference to the working plane which, for convenience, may be considered as the plane of the bottom face of disc 10. The actual working plane is a plane at the surface of the work pieces and perpendicular to the arbor axis upon which the disc 10 is to be rotated. It will be seen that any machining operations performed upon objects held in the grooves 14 will result in surfaces upon those objects which lie in the working plane.

Figure 2:
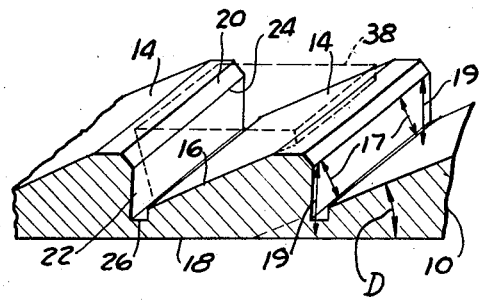
Figure 2 is an enlarged fragmentary sectional view on line 2—2 of Figure 1.

Referring now to Figure 2, each groove 14 has a flat bottom surface 16 which forms a dihedral angle D with the bottom surface 18 of the disc 10; that is to say, with the working plane. The left hand side of each groove 14 is formed by two angularly related surfaces 20 and 22, which are accurately machined so that their intersection provides an edge 24 analogous to a knife edge. A relief groove 26 may be provided for convenience in machining. The surfaces 16, 20 and 22 are so machined with reference to each other that the edge 24 is parallel to surface 16 (as shown by arrows 17), and at the same time is also parallel to the working plane 18 (as shown by arrows 19).

Figure 7:
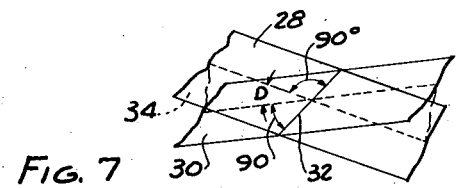
Figures 7 and 8 are diagrams illustrating some of the geometric planes and angles referred to in the specification.
Figure 8:
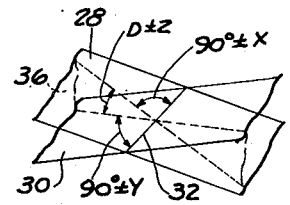

Referring now to Figures 7 and 8, there are shown two planes 28 and 30 which intersect in a line 32. The dihedral angle D between the planes is measured in a third plane which is perpendicular to the line 32 and intersects the planes 28 and 30 by lines which are at right angles to the line 32 in these respective planes, as illustrated in Figure 7.

Figure 8 illustrates the inaccuracy involved if it is attempted to measure the dihedral angle in a plane which is not at right angles to both planes 28 and 30. Here the measuring plane 36 is not perpendicular to the intersection line 32, and it intersects planes 28 and 30 at angles differing from 90°. Consequently, the angle between planes 28 and 30 measured in the plane 36 differs from the true dihedral angle D by a positive or negative increment.

It is accordingly necessary to orient one prism so that the plane of its dihedral angle bears a predetermined relation to the plane of the dihedral angle of another prism and to the imaginary line of intersection of the planes of the optical faces of the prisms if accuracy is to be achieved in cemented achromatic optical prisms.

Figure 3:
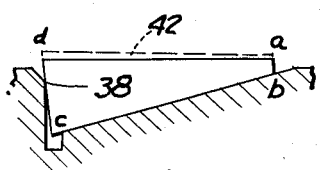
Figure 3 is a diagrammatic view showing a machining operation upon a prism element held in the fixture of Figure 1.

The preferred form of the machining method of the present invention utilizes the disc 10 as a support for a plurality of prism blanks 38. The blanks 38 may be either cast in the general shape required, allowing sufficient stock for removal in the machining process, or they may be cut from solid glass stock. The blanks 38 are mounted by a suitable temporary cementing material, such as transfer wax, in the grooves 14 and distributed in a pattern which approaches symmetrical filling of the surface of disc 10 as closely as practical. When the prisms are firmly attached, the disc 10 is mounted on a glass grinding machine and the excess material indicated at 42 in Figure 3 is removed. This is essentially a flat facing operation which brings the machined surfaces of all of the blanks 38 into a common working plane parallel to the plane 18.

Figure 4:
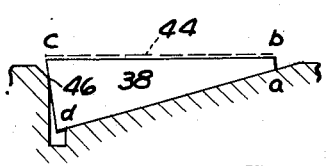
Figure 4 is a diagrammatic view showing a subsequent machining operation on the prism of Figure 3.

The disc 10 is then removed from the grinding machine and placed on a polishing machine and the top faces of all of the prism elements are polished to produce an optical refracting surface of high accuracy and quality. The fixture 10 is then removed from the polishing machine and the prism blanks 38 are, all of them, removed from the fixture. The half-finished blanks may then be given a coat of lacquer or other protective material on their finished surface, and inverted to be mounted again on the fixture 10 with the finished faces down as illustrated in Figure 4. The grinding operation and the polishing operation is repeated to produce another accurate optical refracting face on the upper surface of the blank.

Upon removal of the blanks from the fixture 10 it will be seen that the finished surfaces not only have a positively determined dihedral angle D, but they also have a reference surface 46 whose central portion contains a line perpendicular to the plane in which the dihedral angle is measured, or parallel to the intersection of the planes of the two optical surfaces. The first characteristic comes about by reason of the final finishing of the second optical face in a plane parallel to the working plane 18 while the opposite face is in contact with plane 16 which is accurately related to the working plane 18 by the dihedral angle D.

The second characteristic comes about by reason of the reference surface 46 having its mid-portion in contact with the edge 24 since this edge is at the same time parallel both to the working plane 18 and to the angular surface 16. It is also parallel to the imaginary intersection line 32 of Figure 7. Likewise, it is perpendicular to the plane 34 in Figure 7 in which the dihedral angle is measured. Consequently, the surface 46 having been in contact with the edge 24 while the dihedral angle was formed must contain a line at its mid-portion having parallelism to both optical faces.

Figure 5:
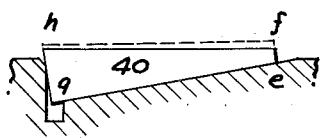
Figure 5 is a diagrammatic view showing a machining operation on another prism element.
Figure 6:
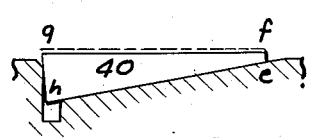
Figure 6 is a diagrammatic view showing a subsequent machining operation on the prism element of Figure 5.

In order to form cemented achromatic prisms, more than one prism is required, and usually they have different dihedral angles. For this purpose prism elements 40 may be machined as illustrated in Figures 5 and 6 by the identical process except that they are mounted in grooves having a different dihedral angle. Such grooves may be formed in another fixture 10, or a single fixture may be provided having some grooves with one dihedral angle and other grooves with a different dihedral angle.

Figure 9:
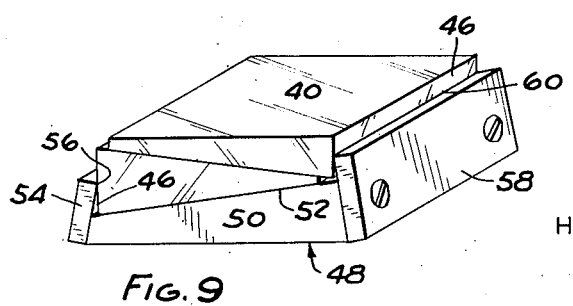
Figure 9 is a view illustrating a method of assembly of an achromatic prism embodying a preferred form of the present invention.

In order to provide a finished cemented achromatic prism with accurately oriented elements, a fixture such as the fixture 48 in Figure 9 may be utilized. This comprises a base 50 having a plane upper surface 52. The surface 52 is preferably angularly related to the bottom of the base 50 by one-half of the angle of the lower prism element. At the left hand edge of base 50 there is provided a locating bar 54, having a knife edge 56 parallel to the plane surface 52, and spaced therefrom by the same distance that the edge 24 is located from the surface 16. Along its right hand edge the fixture 48 is provided with another locating bar 58 having a knife edge 60, which is also parallel to the knife edge 56. The edge 60 is suitably spaced above the surface 52 so as to strike the mid-point of the prism element 40 when laid upon top of prism element 38, as shown in Figure 9.

By assembling the two elements in the position illustrated, with a layer of cement in between and maintaining the locating surfaces 46 in contact with the respective knife edges 56 and 60, it will be seen that the two prisms will be accurately oriented so that the plane in which the dihedral angle is measured for each prism lies perpendicular to the respective knife edges 56 and 60. Since these are parallel, the dihedral angles of both prism elements may then be accurately measured in a single plane which is perpendicular to these knife edges.

It will thus be seen that the present invention provides a method of machining of prism elements which have optical refracting faces related to each other at a dihedral angle which may be repetitively duplicated in quantity production with a high degree of accuracy. Such prism elements are furthermore formed with a third reference surface by which the orientation of the true dihedral angle may be readily established. In addition, the present method provides a highly accurate way to assemble two or more prism elements to form a cemented achromat wherein the orientation of the elements with respect to each other is readily maintained during assembly with a high degree of accuracy.

It will also be seen that, where the prisms to be machined are in the shape of an isosceles triangle or one approximating such shape, the present method enables both sides of the prism to be machined while the opposite side is located on one and the same set of reference surfaces. That is to say, the prisms may be turned over and laid back again upon the same mounting and the area to be machined particularly in the polishing operation is substantially the same in either case, thus enabling the prisms to be distributed equally over the whole area of the plate as is desirable in order to obtain accurate polished flats.

Another feature resides in the use during the cementing process of the same reference surface for orientation of the dihedral angle as was used when that dihedral was originally generated in machining, thus more accurate cemented achromats are obtained than has been previously possible.

While the form of embodiment of the invention as herein disclosed constitutes a preferred form, it is to be understood that other forms might be adopted, all coming within the scope of the claims which follow. In the foregoing specification and in the appended claims reference is made to certain lines and planes which in the embodiment illustrated are formed by certain edges and surfaces. Where the terms "line" and "edge" are used, it will be understood they will include two or more points located in a line and where the terms "plane" or "surface" are used they are intended to include three or more points located in a plane; and the terms are used in this broad sense.

What is claimed is as follows:

1. The method of machining two angularly related plane refracting faces of an optical prism from a blank having a pair of surfaces roughly approximating the desired refracting faces of the finished prism and having a third plane surface intersecting both of the first-named surfaces, comprising positioning the blank in a fixture with one of the pair of surfaces cemented onto a plane area lying at a predetermined dihedral angle to a working plane and with the third plane surface substantially in line-contact with an edge on the fixture which is parallel to both the plane area to which the blank is cemented and the working plane, finishing the second surface of the pair to an optical face which lies in the working plane, removing the half-finished blank from the fixture and repeating the process with the blank inverted, to position the finished optical face on the same plane area of the fixture with the third surface in line contact with said edge.

2. The method of constructing a cemented achromatic prism comprising forming first and second prism elements each with optical faces at respective dihedral angles and each having a third plane surface intersecting both optical faces and containing a line adjacent its median portion which lies parallel to both optical faces and cementing the elements together in a fixture having a plane surface to receive one optical face and a pair of edges each parallel to the last-named surface while maintaining said third plane surfaces each in contact with one of said edges.

3. The method of constructing a cemented achromatic prism comprising forming first and second prism elements each with optical faces at respective dihedral angles and each having a reference surface perpendicular to the plane of the dihedral angle and cementing the elements together while maintaining said reference surfaces each respectively in line-contact with two parallel edges which are also parallel to one optical face of one element.

4. The method of constructing a cemented multi-element prism comprising finishing a first element while a reference surface of the element is in contact with a knife edge and while a refracting surface of the element is in contact with a plane parallel to the knife edge, finishing a second element while a reference surface of the element is in contact with a knife edge and while a refracting surface of the element is in contact with a plane parallel to the knife edge, and cementing the elements together while one element is in contact with a plane and with a positioning edge parallel to the plane and while the other element is in contact with the first element and with a second positioning edge which is parallel to the last-named plane and to the first-named positioning edge.

5. The method of machining two surfaces of an optical prism which are disposed at a dihedral angle to each other comprising finishing one surface while the other surface is adhesively secured to a plane and while a third surface of the prism is in line-contact with an edge parallel both to said plane and to the finishing plane and finishing the other surface while the prism is inverted with the one surface and the third surface positioned in like manner.

6. The method of machining two surfaces of an optical prism which are disposed at a dihedral angle to each other comprising finishing one surface while the other surface is adhesively secured to a plane at a corresponding dihedral angle with respect to the finishing plane, and while a third surface of the prism is in line-contact with an edge parallel both to said plane and to the finishing plane and finishing the other surface while the prism is inverted with the one surface and the third surface positioned in like manner.

7. The method of machining an optical prism which comprises forming a blank with a cross-section substantially that of an isosceles triangle, mounting the blank solely by means of the area of one of the two equal sides and a line-contact upon the base with an edge perpendicular to the plane of the dihedral angle between the two equal sides, machining the exposed side to a finished refracting face, inverting and remounting the blank solely by means of the area of the finished side and a line-contact upon the base with an edge perpendicular to the plane of the dihedral angle between the two equal sides, and machining the exposed surface to a finished refracting face.

8. The method of constructing a cemented achromatic prism which comprises forming each prism element with a locating surface perpendicular to the plane of the dihedral angle between the refracting faces of the elements and cementing the elements together while stacked upon a plane and while each locating surface is in contact with a locating edge positioned parallel to the plane and to each other locating edge.

References Cited in the file of this patent

UNITED STATES PATENTS

| | | |
|---|---|---|
| 1,307,598 | Phillips | June 24, 1919 |
| 2,382,580 | Rackett | Aug. 14, 1945 |
| 2,393,073 | Tenny | Jan. 15, 1946 |
| 2,409,108 | Crowley | Oct. 8, 1946 |
| 2,420,606 | McLeod | May 13, 1947 |